US005695900A

United States Patent [19]
Selim

[11] Patent Number: 5,695,900
[45] Date of Patent: Dec. 9, 1997

[54] SURFACE TREATMENT OF MAGNETIC PARTICLES FOR USE IN REPROGRAPHIC PROCESSES

[75] Inventor: Sami Selim, Golden, Colo.

[73] Assignee: Colorado School of Mines, Golden, Colo.

[21] Appl. No.: 576,811

[22] Filed: Dec. 21, 1995

[51] Int. Cl.$^6$ .................................................. G03G 9/083
[52] U.S. Cl. ........................ 430/106.6; 430/137; 428/457
[58] Field of Search .............................. 430/106.6, 137; 428/457

[56] References Cited

U.S. PATENT DOCUMENTS

| | | | |
|---|---|---|---|
| 4,450,221 | 5/1984 | Terada et al. | 430/106.6 |
| 4,609,607 | 9/1986 | Takagi et al. | 430/106.6 |
| 4,886,752 | 12/1989 | Lovley | 435/168 |
| 5,049,448 | 9/1991 | Ohya et al. | 428/409 |
| 5,080,992 | 1/1992 | Mori et al. | 430/109 |
| 5,193,751 | 3/1993 | Mori et al. | 241/3 |
| 5,202,209 | 4/1993 | Winnik et al. | 430/106.6 |
| 5,278,018 | 1/1994 | Young et al. | 430/110 |
| 5,316,699 | 5/1994 | Ritter et al. | 252/584 |
| 5,424,129 | 6/1995 | Lewis et al. | 428/403 |

FOREIGN PATENT DOCUMENTS

| | | |
|---|---|---|
| 60-26954 | 2/1985 | Japan . |
| 63-250660 | 10/1988 | Japan . |
| 2-97968 | 4/1990 | Japan . |
| 4-268570 | 9/1992 | Japan . |
| 5-186669 | 7/1993 | Japan . |
| WO 93/14022 | 7/1993 | WIPO . |

*Primary Examiner*—John Goodrow
*Attorney, Agent, or Firm*—Holme Roberts & Owen

[57] ABSTRACT

Provided is a method for producing nano-size magnetic particles, and particularly magnetite and maghemite particles, that are useful in preparing toner products for reprographic processes. The magnetic particles are made of a controlled size through the use of a microemulsion. Precursor particles are precipitated in droplets of a disperse aqueous phase of the microemulsion. The precursor particles are oxidized in a carefully controlled environment to form the desired magnetic particles and to avoid overoxidation to produce undesirable nonmagnetic particles, such as hematite. In one embodiment, the nano-size magnetic particles are treated to improve their hydrophobicity. The treated particles have a reduced tendency to agglomerate and are easier to disperse in the preparation of toner products. The hydrophobic treatment may include connecting hydrophobic chemical groups to the magnetic particles through the use of silane coupling agents. In addition to improving the flowability characteristics of the magnetic particles, hydrophobic treatment may also be used to at least partially mask the inherent color of the nano-size magnetic particles that could otherwise interfere with preparation of color toners for use in developing sharp color images.

25 Claims, 8 Drawing Sheets

SURFACE TREATMENT OF MAGNETIC PARTICLES FOR USE IN REPROGRAPHIC PROCESSES

FIELD OF THE INVENTION

The present invention involves the manufacture of nano-size magnetic particles useful for reprographic processes and the nano-size magnetic particles produced thereby.

BACKGROUND OF THE INVENTION

Reprographic processing involves the formation of printed images on sheet substrates such as paper. Examples of reprographic processing include the printing of facsimile transmissions, making of photocopies, and printing of electronically stored information from a computer. Technological developments over the last several years have made available high quality, relatively low cost facsimile machines, photocopiers and printers for black print applications. The same low cost, high quality options are not available, however, for color print applications.

High quality color ink jet printers have been introduced in recent years. These printers use a liquid jet spray to form a color image on paper. Although print images are of high quality, the printing process is slow and requires special paper, which increases the cost of the process.

Color laser printers have also been introduced, in which a dry toner is mechanically applied to a drum to develop the desired image. These color laser printers, however, require image-on-image development, with each color being developed separately to create the ultimate desired composite color image. Image-on-image development requires that each separate color image be transferred for storage onto an intermediate device, where the composite image is developed by overlaying individual color images. The finished composite image is then transferred to a piece of paper for printing. Each color is thus developed in a separate step, which significantly slows the printing operation and requires the expense and complications associated with the intermediate storage device.

Fast and relatively inexpensive laser printers are available for black printing that do not require mechanical application of toner to a drum. These printers use "jump gap" technology in which magnetic particles embedded in toner particles assist the toner particles in "jumping" across a gap and onto a drum where the image is developed. Such jump gap processing does not require mechanical application of the toner to the drum. Color printing could, therefore, theoretically be accomplished on such a laser printer without the burden and expense of the image-on-image development process of current color laser printers. One problem with adapting the jump gap technology for color printing, however, is that the inherent color of magnetic particles used in the toner significantly dulls and distorts the sharpness of pigments or dyes that may be used in the toner to provide the desired color. One proposal for reducing the dulling and distortion of color caused by magnetic particles is to use nanocrystalline gamma-$Fe_2O_3$ as the magnetic particles (R. F. Ziolo et al., Matrix-Mediated Synthesis of Nanocrystalline gamma-$Fe_2O_3$: A New Optically Transparent Magnetic Material, *Science*, volume 257, July 1992, pp. 219–223). Due to their small size, it is proposed that such particles would tend to be more transparent than the larger magnetic particles currently used in toner compositions and would, therefore, not distort colors as much as the currently used magnetic particles.

The nanocrystalline gamma-$Fe_2O_3$ reported by Ziolo et al. was formed in the porous network of an ion-exchange resin. The resin was used to constrain the reaction environment and to isolate and stabilize the particles during their formation. The resulting composite is in the form of clear, amber colored resin beads having a diameter of about 50–100 micrometers. These beads are much too large for use in reprographic processes. Also, the nanocrystalline gamma-$Fe_2O_3$ is difficult to separate from the resin in a manner to provide useful nano-sized particles that could be incorporated into a toner product.

It has also been proposed that nano-sized magnetite particles for use in toners could be prepared by microbial action (U.S. Pat. No. 4,886,752 by Lovley, issued Dec. 12, 1989). Lovley discloses extracellular, microbial production of ultrafine-grained magnetite ranging in size from about 10 to 5 nanometers. Such microbially produced magnetite could, however, be difficult to separate and sufficiently clean for practical use in reprographic processes. Furthermore, Lovley reports that the nano-size particles are present as aggregates. Such aggregates would not be suitable for use in toners and would require significant processing to break up the aggregates, which would be required to obtain the full benefit of the small size of individual grains. Moreover, the microbial process would not provide significant flexibility in preparing magnetic particles of different sizes for different reprographic applications.

Based on the foregoing, there is a need for improved nano-size magnetic particles for use in reprographic processing and for processes of making such particles, especially for use in reprographic processes in which color images are desired.

SUMMARY OF THE INVENTION

According to the present invention, nano-size magnetic particles, and particularly magnetic particles of magnetite or maghemite, are provided for use in toners for reprographic processes. During manufacture of the nano-size magnetic particles, the disperse phase of a microemulsion is used to constrain the size of particles being formed. In a water-in-oil type of microemulsion, a metal-containing reactant is dissolved in the disperse aqueous phase. The metal-containing reactant is reacted in the disperse phase to form precursor particles of controlled size in the desired nano-size range. The precursor particles may then be converted to the desired magnetic material through use of a carefully controlled oxidation step. The oxidation must be carefully controlled to avoid excessive oxidation that would result in formation of undesirable nonmagnetic material, such as hematite in the case of iron-containing materials. The process permits careful control of particle size. Particles produced preferably are smaller than about 60 nanometers and more preferably smaller than about 40 nanometers. One important aspect of the present invention is that the magnetic particles, although being in the nanometer size range, exhibit adequate magnetic properties to permit their use in toner products for reprographic processes. Also, the method of manufacture of the present invention produces particles which are of high purity, are clean and are easy to separate for use in toner products.

Another aspect of the present invention is use of the nano-size magnetic particles in the production of toner products. The magnetic particles are mixed with a polymer resin and, optionally, other additives as desired. The mixture is formed into toner particles having a size generally smaller than about 10 microns, and preferably smaller than about 8 microns. Because the toner particles comprise the nano-size magnetic particles, colors are not as detrimentally affected as with larger, conventionally available magnetic particles.

In one embodiment of the present invention, the nano-size magnetic particles are subjected to a surface chemical treatment to improve the hydrophobicity of the magnetic particles and to thereby also improve the flowability of the particles. Such a surface treatment reduces the potential for agglomeration of the nano-size particles and makes it easier to disperse the nano-size particles in a polymer resin to make a toner product.

During the surface treatment, hydrophobic chemical groups are placed about the surface of the magnetic particles. In one embodiment, the hydrophobic chemical groups are provided by fatty acid salts. In another, preferred embodiment, the hydrophobic chemical groups are connected with the magnetic particles through covalent bonding. The covalent bonding preferably involves the use of a silane coupling agent intermediate between the magnetic particles and the hydrophobic chemical groups.

In another embodiment, the hydrophobic chemical groups at least partially mask the inherent color of the underlying magnetic particles. Also, the hydrophobic group could contain a chromophore to impart some coloration to the magnetic particles to further reduce detrimental effects on the sharpness of colors when the magnetic particles are blended into a color toner product.

DETAILED DESCRIPTION

The present invention involves nano-size magnetic particles useful in reprographic processes. As used herein, nano-size magnetic particles include magnetic particles having a size of smaller than about 100 nanometers. The present invention also involves methods for making nano-size magnetic particles for use in reprographic processes, and especially in non-impact reprographic processes for recording a printed image on a sheet substrate, such as paper. Reprographic processes include photocopying, printing of facsimile transmissions and normal printing operations controlled by a microprocessor. The magnetic nanoparticles of the present invention are particularly useful for reprographic processes using jump gap technology, in which print medium, such as toner, is transferred to a drum to develop a desired image without mechanical application of the print medium to the drum. Preferred magnetic particles of the present invention include magnetite ($Fe_3O_4$) and maghemite (gamma-$Fe_2O_3$), although the principles discusses herein with reference to magnetite and maghemite could apply equally to other nano-size magnetic particles as well.

Manufacture of the magnetic particles of the present invention may be accomplished by using the droplets of a disperse phase of a microemulsion as microreactors to limit the size of resulting particles. In particular, it is preferred that aqueous phase droplets of a water-in-oil microemulsion function as the microreactors. These disperse aqueous phase droplets are often referred to as reverse micelles, and the microemulsion may be referred to as a reverse micellar system.

Figure 1:
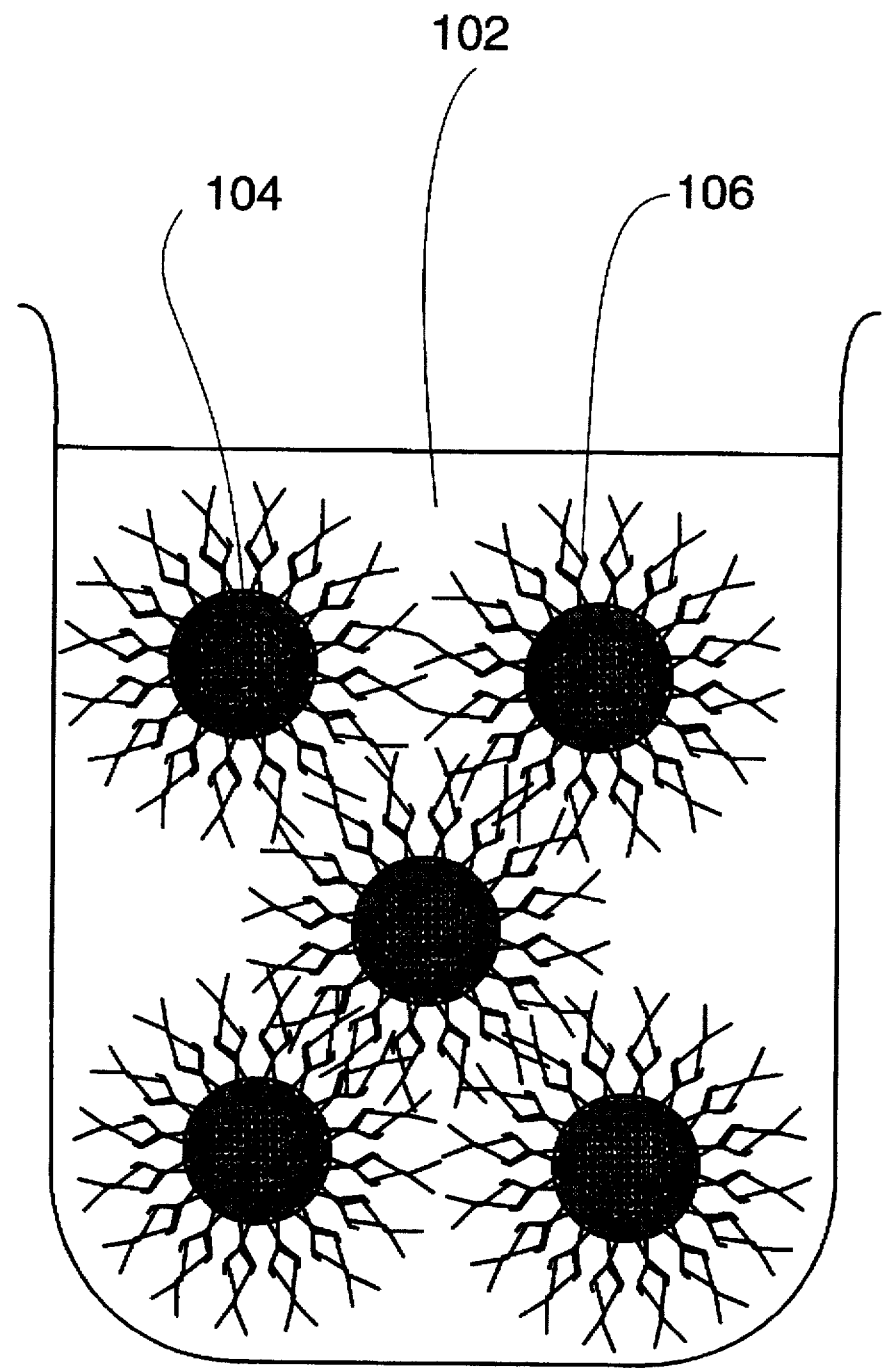
FIG. 1 shows a microemulsion useful in the present invention.

FIG. 1 shows a microemulsion having a continuous phase 102 of a non-polar organic liquid, and a disperse phase 104 of droplets of a polar liquid. The disperse phase typically comprises an aqueous liquid. At the interface between the continuous phase 102 and the disperse phase 104 is a surfactant 106 that helps to stabilize the microemulsion.

Figure 2:
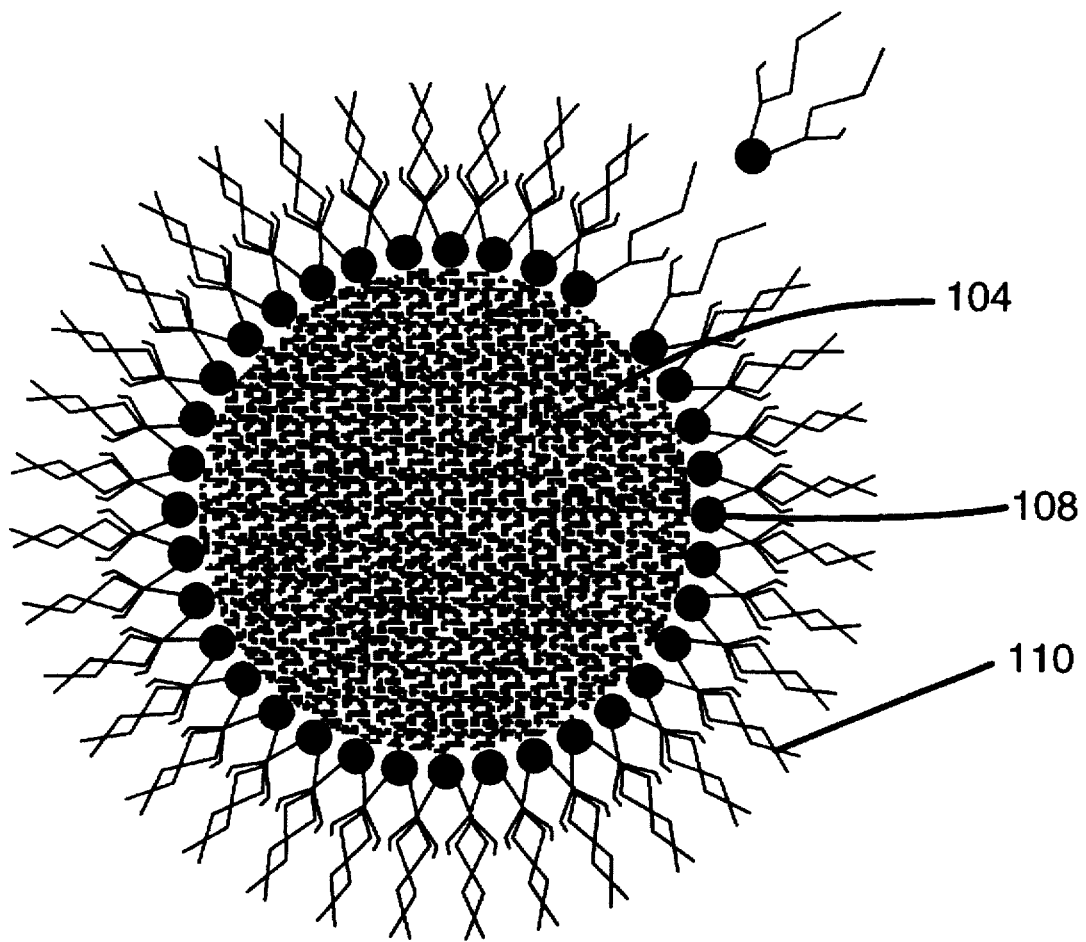
FIG. 2 shows a reverse micelle of a microemulsion useful in the present invention.

FIG. 2 shows an expanded view of a reverse micelle of a water-in-oil emulsion having an aqueous core of disperse phase 104 surrounded by surfactant molecules each having a hydrophilic head 108, in association with the aqueous liquid of the disperse phase, and a hydrophobic tail 110, in association with the nonpolar organic liquid of the continuous phase 102.

Figure 3:
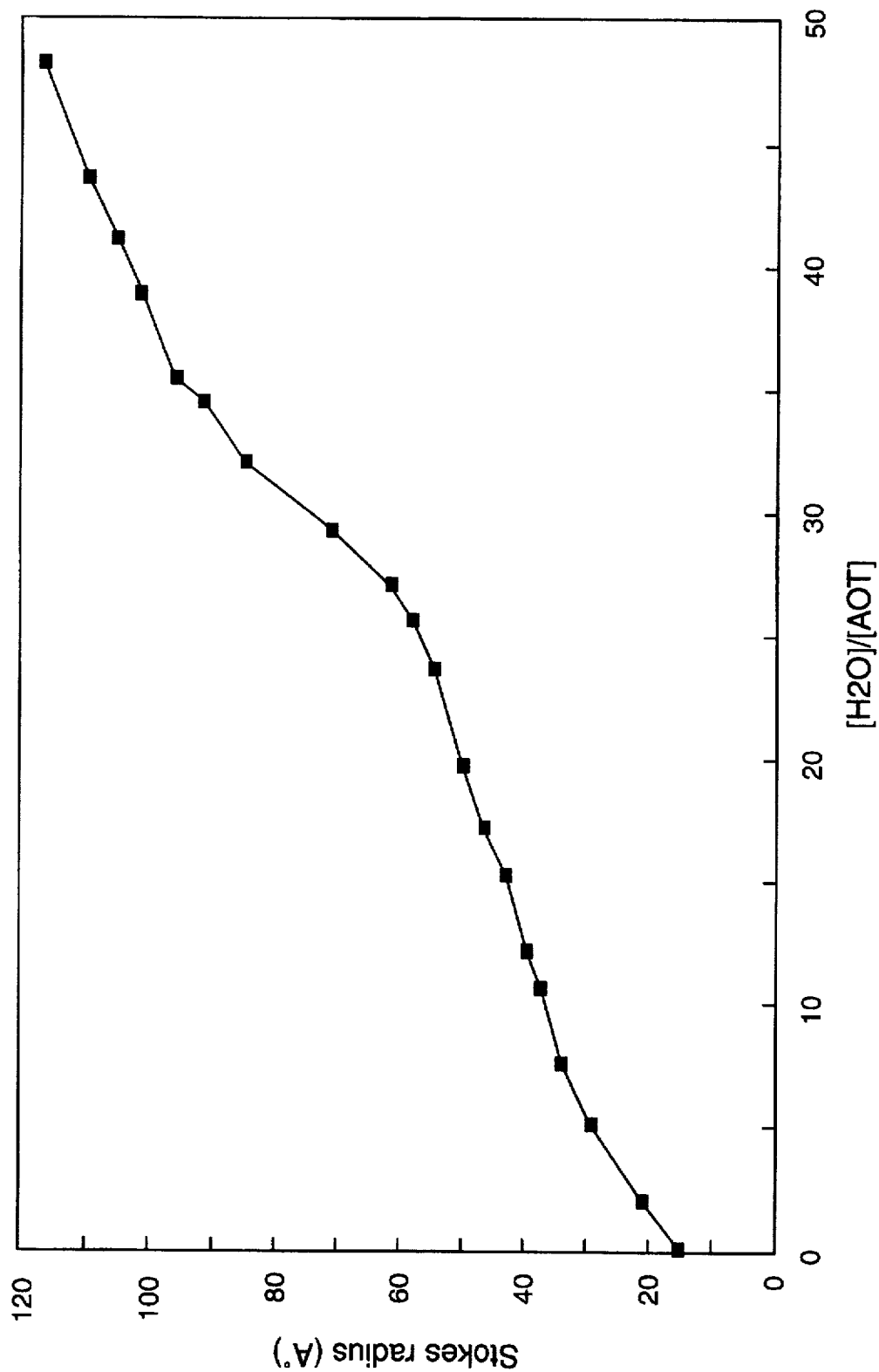
FIG. 3 is a graph of the size of reverse micelles in a microemulsion useful in the present invention as a function of the relative concentrations of water and a surfactant.

Reverse micelles, as shown in FIG. 2, typically have a size of from about 1 nanometer to about 100 nanometers diameter, with the size being controlled by the relative amount and type of surfactant used. FIG. 3 shows a plot of Stokes radius (in angstroms) of reverse micelles as a function of the ratio of water concentration to surfactant concentration. In a system having aerosol OT (AOT) as a surfactant and isooctane as a continuous phase. As shown in FIG. 3, the size of the reverse micelles generally decreases with increasing relative amounts of surfactant. Preferred surfactants for use with the present invention include sodium dodecyl sulfate (SDS) and aerosol OT (AOT). The preferred size of reverse micelles for use with the present invention are of a diameter from about 20 nanometers to about 60 nanometers, with about 40 nanometers being particularly preferred.

Figure 4:
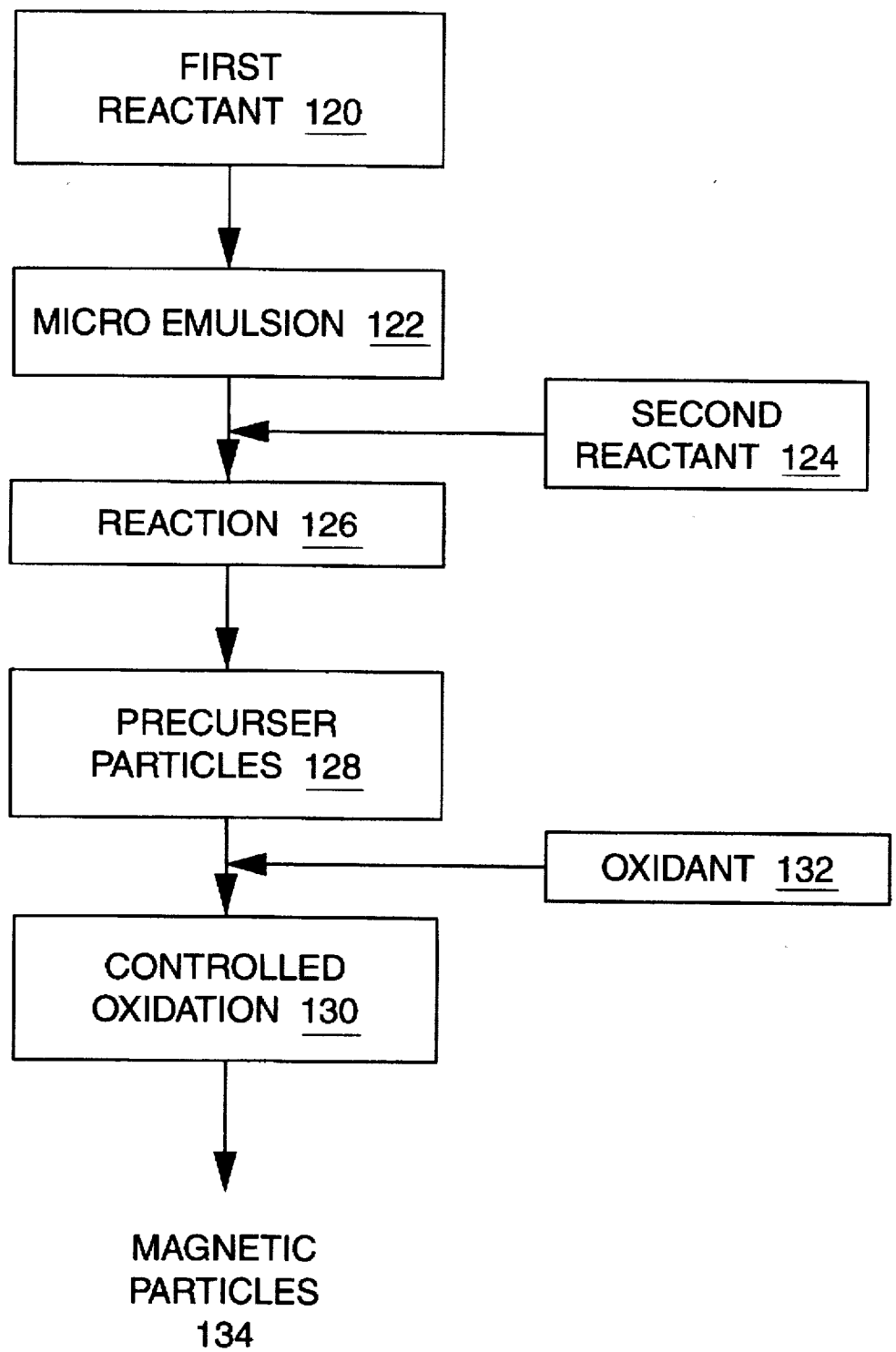
FIG. 4 is a flow diagram showing process flow for one embodiment of the present invention.

FIG. 4 is a process flow diagram for one embodiment of the present invention involving use of a microemulsion system to prepare nano-size magnetic particles. As shown in FIG. 4, a metal-containing first reactant 120 is placed into the disperse aqueous phase of a microemulsion 122. A second reactant 124 is added to the microemulsion 122 to cause a reaction 126 involving the first reactant 120 and the second reactant 124 to form metal-containing precursor particles 128. The precursor particles 128 are then subjected to controlled oxidation 130 in the presence of an oxidant 132 and magnetic particles 134 are formed.

To prepare iron-containing magnetic particles 134, the first reactant 120 is preferably an iron-containing salt dissolved in aqueous droplets of the disperse phase of the microemulsion 122. Iron-containing magnetic particles 134 include those of magnetite and maghemite. The salt may be any suitable salt, including a nitrate, sulfate or halide salt, and preferably is a ferrous salt. A particularly preferred iron-containing salt is ferrous chloride, which may be in the form of a hydrate.

The microemulsion 122 may be prepared by mixing an aqueous liquid having the first reactant in solution with a suitable surfactant and a nonpolar organic liquid. The mixture is then vigorously mixed to convert the aqueous liquid into disperse phase droplets in a microemulsion. The disperse phase preferably comprises droplets having a size of smaller than about 60 nanometers. Preferably, the process is conducted under a blanket of inert gas, such as nitrogen gas, beginning with preparation of the microemulsion 122 and continuing through the controlled oxidation 130.

A preferred surfactant is SDS, which is more preferably used in combination with AOT as a cosurfactant. Preferably, the amount of surfactant used is in the range of 30 to 70 weight percent relative to water for SDS and in the range of 250 to 400 weight percent relative to water for AOT.

The organic liquid may comprise any suitable nonpolar organic liquid. A preferred organic liquid is isooctane because it is relatively inexpensive and easy to work with. Other possible organic liquids include other alkanes, including normal alkanes, branched alkanes and cycloalkanes (e.g., hexane, heptane, octane, decane, cyclohexane); aromatics including toluene and benzene; and halogenated alkanes such as methylene chloride. The organic liquid is generally present in an amount greater than about 30 parts organic liquid to one part of the aqueous liquid.

The second reactant 124 may be any material capable of reacting with the first reactant 120 to assist in the formation of the desired precursor particles 128. The first reactant 120 is typically dissolved in the disperse aqueous phase of the microemulsion 122 and the reaction 126 causes precipitation in the disperse phase to form the desired precursor particles 128. The disperse aqueous phase typically has an acidic pH of from about 3 to about 5 prior to the reaction 126. The second reactant 124 generally comprises a basic material. The pH of the disperse aqueous phase, therefore, increases during the reaction 126. The second reactant could be a hydroxide such as an alkali, ammonium or alkaline earth hydroxide. Such hydroxides would typically be provided in a separate microemulsion having the hydroxide dissolved in a disperse aqueous phase. The microemulsion having the second reactant 124 could then be added to the microemulsion 122 to cause the reaction 126.

Although hydroxides may be used as the second reactant 124, as described, it is preferred that less basic materials be used. The use of a hydroxide as the second reactant 124 generally requires that a buffer also be added to prevent the pH in the disperse aqueous phase of the microemulsion 122 from becoming too high. The pH of the aqueous disperse phase of the microemulsion 122 is extremely important to ensure ultimate production of the desired magnetic particles 134. If the magnetic particles 134 are of magnetite, the pH in the disperse aqueous phase should be raised to an ending pH of from about pH 8 to about pH 10. A higher pH will tend to result in the ultimate preparation of nonmagnetic hematite (alpha-$Fe_2O_3$) rather than the desired magnetite. If the magnetic particles are to be of maghemite, then the pH in the disperse aqueous phase should raised to an ending pH of no higher than about pH 7, and preferably to a pH of from about pH 6 to about pH 7. Preferred as the second reactant 124 are ammonia and amines, with amines being more preferred. Alkyl amines, such as triethylamine, are particularly preferred.

Furthermore, it is preferred that the second reactant 124 be soluble in both the continuous phase and the disperse phase of the microemulsion 122. It would, therefore, be unnecessary to prepare a separate microemulsion for the purpose of adding the second reactant 124 to the microemulsion 122. Rather, the second reactant 124 may be dissolved in a separate batch of the organic liquid and added to the continuous phase of the microemulsion 122. Alkyl amines such as triethylamine have such dual solubility.

When making iron-containing magnetic particles 134, the precursor particles will typically be a green rust. The green rust precursor particles comprise a complex involving ferrous hydroxide. In the controlled oxidation 130, the green rust is oxidized to permit formation of the desired magnetic iron oxide for the magnetic particles 134.

The controlled oxidation 130 is preferably accomplished while the precursor particles 128 remain dispersed in the disperse aqueous phase of the microemulsion 122. The microemulsion 122 may be heated to accelerate the controlled oxidation 130.

The oxidant 132 may be any oxygen-containing material capable of oxidizing the precursor particles. It is essential that the rate at which oxidation occurs, however, be carefully controlled to avoid preparation of nonmagnetic materials. When making magnetite or maghemite, if oxidation is not carefully controlled, a nonmagnetic hematite product will be readily produced rather than the desired magnetic material. It is preferred that the controlled oxidation 130 be conducted substantially in the absence of gaseous oxidants, and especially in the absence of free oxygen gas, because it is difficult to control the oxidation in the presence of such gaseous oxidants. Rather, it is preferred that oxidation be controlled by providing an oxidant 132 from a liquid solution and that a carefully controlled amount of the oxidant 132 be used. For example, when isooctane is used as a continuous organic phase, the isooctane may be saturated with oxygen by aeration prior to preparation of the microemulsion 122. The oxygen in solution in the isooctane then supplies the necessary oxidant in the controlled oxidation 130 for preparation of the magnetic particles 134.

A more preferred oxidant is to use an oxygen-containing salt dissolved in an aqueous phase liquid that may be added to the microemulsion 122 having the precursor particles 128. Preferred salts are those of alkali metals, especially sodium and potassium nitrates and nitrites. For example, sodium nitrite may be dissolved in water and the water used to form a disperse aqueous phase in a separate microemulsion that is added to the microemulsion 122 to provide the oxidant 132. The sodium nitrite provides the necessary oxygen for oxidation of the precursor particles 128 to form the desired magnetic particles 134. Additional oxidants that may be used include peroxides, and especially hydrogen peroxide. As noted previously, the process should preferably be conducted under an atmosphere of inert gas, such as nitrogen gas, until the magnetic particles 134 have been formed.

The size of magnetic particles 134 produced depends mainly upon the amount of surfactant used relative to water in preparing the microemulsion 122. A larger relative amount of surfactant generally leads to larger dispersed aqueous droplets and, accordingly, to larger resulting magnetic particles 134. The size of the magnetic particles 134 may be varied from about 1 nanometer to about 100 nanometers. Preferred magnetic particles 134 have at least about 90 weight percent of the particles being of smaller than about 60 nanometers in size and more preferably smaller than about 40 nanometers in size. Magnetic particles 134 having at least 90 weight percent of the particles between about 10 nanometers and about 40 nanometers are particularly preferred.

The process of the present invention permits manufacture of magnetic particles 134 having a very narrow size distribution with preferably 90 weight percent of the magnetic particles 134 being from about 50 percent smaller to about 50 percent larger than the average particle size, and more preferably from about 20 percent smaller to about 20 percent larger than average particle size. The average particle size may be obtained through transmission electron microscopy electronically from generated images through available software and manually by measuring the diameters of particles in a representative sampling and computing a simple average of the particle diameters.

The magnetic particles 134 also have excellent magnetic properties for use in reprographic processes. Although the saturation magnetism is lower than for larger, conventional magnetic particles, saturation magnetism remains satisfactory in the magnetic particles 134 of the present invention. Magnetic particles 134 of smaller than about 40 nanometers have a saturation magnetism that is preferably greater than about 15 emu/g, more preferably greater than about 25 emu/g and most preferably greater than about 35 emu/g. The high saturation magnetism of the magnetic particles 134 is believed to be due to the high purity of the particles produced. For magnetite and maghemite, particles in excess of 90 weight percent in purity of the magnetic iron oxide are obtained, with purities often exceeding 95 weight percent.

After the magnetic particles 134 have been formed, the magnetic particles 134 may be recovered by breaking the microemulsion. The microemulsion may be broken using any suitable technique. One effective technique is to simply add sufficient water to cause the aqueous phase droplets to coalesce, with the magnetic particles 134 staying with the aqueous phase. The organic liquid may be decanted off and the magnetic particles recovered from the remaining aqueous liquid by any suitable method such as by filtration or centrifugation.

For additional information concerning preparation of magnetic particles involving precipitation in a disperse aqueous phase of a microemulsion reference is made to Selim et al., "Preparation of Nano-size Magnetic Gamma-Ferric Oxide (gamma-Fe$_2$O$_3$) and Magnetite (Fe$_3$O$_4$) Particles for Toner and Color Imaging Applications", Proceedings of IS&T 11th International Congress on Advances on Nonimpact Printing Technologies, 1995, pp. 106–109; and a thesis by Lyle P. Cunningham entitled "Preparation of Nanocrystalline Magnetic Maghemite (gamma-Fe$_2$O$_3$) and Magnetite (Fe$_3$O$_4$) Particles in Microemulsions", available at the Arthur Lakes Library of the Colorado School of Mines, Golden, Colo., the contents of both of which are incorporated by reference herein in their entireties.

One problem with nano-size particles is that they have a tendency to agglomerate. For the nano-size magnetic particles of the present invention, agglomeration of the particles would detrimentally affect their use in toner products.

In one aspect of the present invention, the nano-size magnetic particles are subjected to a chemical surface treatment to impart improved hydrophobicity to the particles and to thereby reduce the tendency of the particles to agglomerate and to improve dispersibility of the particles to aid in the manufacture of toner and other reprographic print media. The surface treatment preferably occurs prior to a complete centrifugation or other processes that would tend to promote agglomeration.

In one embodiment of the surface treatment, the particles are treated with an amphiphilic material. Preferred amphiphilic materials are salts of fatty acids, such as sodium or potassium laurate or stearate. In a preferred surface treatment, however, hydrophobic chemical groups are connected with the nano-size magnetic particles through covalent bonding, preferably with use of a silane coupling agent.

An example of providing the hydrophobic surface treatment through covalent bonding of a hydrophobic chemical group is as follows. Referring back to the discussion concerning the manufacture of nano-size magnetic particles as described with reference to FIG. 1, after breaking of the microemulsion, the nano-size magnetic particles are permitted to settle and the organic liquid is decanted. After the magnetic particles settle, the aqueous liquid is decanted. The magnetic particles are then washed to remove surfactants and residual organic and inorganic materials that may be contaminating the magnetic particles. The wash may include any suitable solvent. One solvent that has been used is a mixture of chloroform and water. The magnetic particles are typically washed three times with partial centrifugation followed by decantation of the wash liquid between washings. Partial centrifugation refers to centrifugal processing in which centrifugal separation does not proceed to completion. Centrifuging is terminated before the liquid volume is reduced to a point where significant interaction between the magnetic particles occurs. Complete centrifugation should be avoided at this stage because such processing could promote undesirable agglomeration of the magnetic particles.

After washing is complete, an aqueous acidic solution is added to the magnetic particles to form a slurry having about 10 weight percent of solids. The acidic aqueous solution is preferably about pH 4 and preferably comprises an aqueous solution of glacial acetic acid. While the magnetic particles are suspended in the aqueous acidic solution, a solution comprising a silane-based compound to act as a silane coupling agent is added to the solution and the solution heated to cause reaction between the magnetic particles and silane coupling agent. The amount of the silane-based material is preferably from about 0.5 to about 5 weight percent of the magnetic particles. Preferably, the slurry is sonicated during the procedure to maintain the magnetic particles in a disperse suspension. After adding the silane-based compound the slurry is heated, preferably to about 50° C., to promote reaction between the silane-based compound and the magnetic particles. Following reaction with the silane-based compound, the magnetic particles may be separated from the slurry by a complete centrifugation to recover the hydrophobically treated magnetic particles.

As used herein, a silane-based compound includes all compounds including a silicon atom covalently bonded to four constituent chemical groups. Preferred silane-based compounds include alkoxy silanes. One example of such an alkoxy silane is vinyltriacetoxysilane, in which the vinyl group acts as the hydrophobic chemical group to reduce the tendency for agglomeration of the magnetic particles. Other hydrophobic groups include other alkyl groups (saturated and unsaturated, branched and normal), cycloalkyl groups and aromatic groups.

The silane-based compound reacts with hydroxyl groups at the surface of the magnetic particles to form a covalent bond. For example, surface treatment involving vinyltriacetoxysilane would proceed according to the following chemical equation:

(magnetic particle)—OH+CH$_2$CHSi(OCOCH$_3$)$_3$→(magnetic particle)—O—Si(OCOCH$_3$)$_2$CHCH$_2$+CH$_3$COOH In another embodiment, the hydrophobic chemical group at least partially masks the inherent color of the magnetic particle. Because of this masking, the inherent color of the magnetic particles does not as greatly distort the color of dyes or pigments mixed in a toner or other printing medium product. Preferably, the hydrophobic chemical group comprises a chromophore to provide a desired colorant and that also masks, at least in part, the inherent color of the magnetic particles.

When hydrophobic surface treatment involves the use of a hydrophobic chemical group comprising a chromophore, the treatment generally proceeds in two steps. In a first step, a silane-based compound, to act as a silane coupling agent, is reacted with the magnetic particles as described previously. The silane-based compound in this embodiment, however, also has a reactive group that may react, in a second step, with a reactive dye containing the desired chromophore. The reactive group on the silane-based compound may be a hydroxyl group, amino group or thiol group, with an amino group being preferred. Examples of suitable silane-based materials useful as silane coupling agents for this embodiment of the invention include 3-aminopropyltriethoxysilane and 3-aminopropyltrimethoxysilane. The reactive dye is a compound having a chromophore linked to a functional group capable of reacting with the hydroxyl, amino or thiol group of the silane-based compound. As used herein, a silane coupling agent includes not only the unreacted silane-based compound but also the residual chemical group following reaction of the silane-based compound with the magnetic particle and/or with the reactive colorant.

Figure 5:
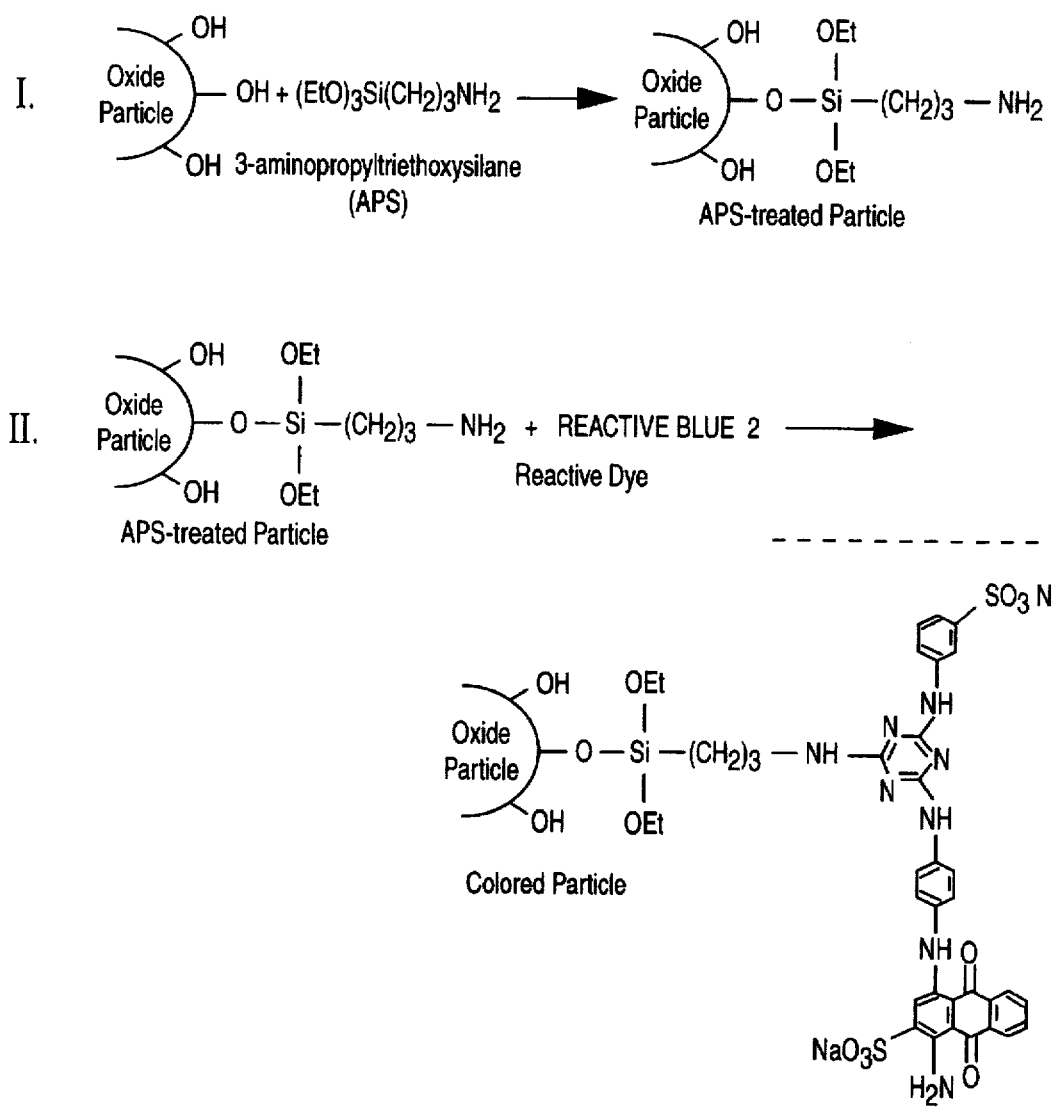
FIG. 5 shows chemical equations of reactions believed to be involved with one embodiment of the present invention for surface treating nano-size magnetic particles.

Table 1 shows some reactive dyes useful with the present invention. These dyes are obtainable from Imperial Chemical Industries. As an example of attaching C.I. Reactive Blue 2 to a nano-size magnetite particle, a silane coupling agent, such as 3-aminopropyltriethoxysilane would first be reacted with the magnetic particle as shown in Equation I in FIG. 5. After reaction with the silane coupling agent, the treated particle would then be reacted with the reactive dye as shown in Equation II in FIG. 5 to form the final colored particle.

TABLE 1

| Dye | Reactive Group | Chromophore |
| --- | --- | --- |
| Procion Turquoise HA C.I. Reactive Blue 71 | Monochlorotriazine | Phthalocyanine |
| Procion Yellow MX-8G C.I. Reactive Yellow 86 | Dichlorotriazine | Azo |
| Levafix Brilliant Red E-6BA C.I. Reactive Red 159 | Dichloroquinoxaline | Azo |
| C.I. Reactive Blue 2 | Monochlorotriazine | Anthraquinone |

EXAMPLES

The following examples further demonstrate the present invention without limiting the scope thereof.

Example 1

This example demonstrates preparation of nano-size magnetic particles comprising magnetite using a microemulsion system. A microemulsion consisting of isooctane as the continuous phase, aqueous ferrous chloride as the dispersed phase, sodium dodecyl sulfate (SDS) as the surfactant, and aerosol *OT (AOT) as co-surfactant is made according to the following procedure. Accurately weigh 1.72 g SDS and 11.61 g AOT and place them in a 500 ml Erlenmeyer flask. To this solid mixture, add 172 ml of isooctane. Next, add 4 ml of 1.0M ferrous chloride ($FeCl_2.4H_2O$) solution. The mixture is then stirred vigorously with a magnetic stirrer for about 4 hours under nitrogen atmosphere until a clear pale yellow microemulsion is formed.

A second microemulsion is prepared by accurately weighing 1.72 g SDS and 11.61 g AOT and placing them in a 500 ml Erlenmeyer flask. To this solid mixture, add 172 ml of isooctane. Next, add 4 ml of 2.0M sodium nitrite ($NaNO_2$) solution. The mixture is then stirred vigorously with a magnetic stirrer for about 4 hours under nitrogen atmosphere until a clear colorless microemulsion is formed.

Figure 6:
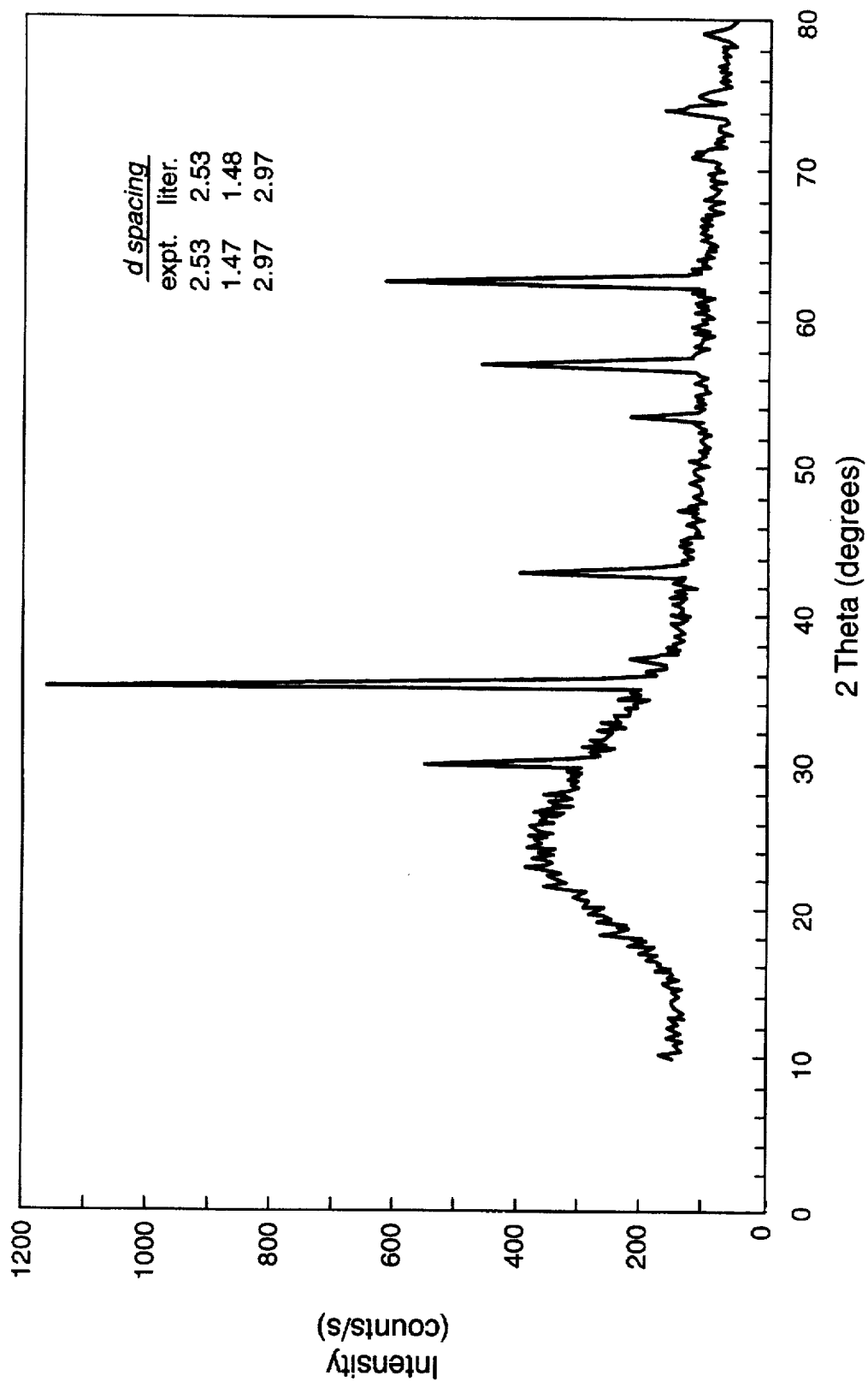
FIG. 6 is a graph showing an x-ray diffraction pattern of nano-size magnetite particles prepared according to one embodiment of the present invention.

Under nitrogen atmosphere, add 8 ml of triethylamine (TEA) to the ferrous chloride microemulsion. A bluish green precipitate is immediately formed upon addition of the TEA solution indicating the formation of green rust precursor particles. To this add 15 ml of the sodium nitrite microemulsion and heat the suspension to 50° C. for 10 minutes while stirring. The green rust transforms through oxidation to a black solution/slurry of magnetite particles suspended in the reverse micelles of the microemulsion. A representative x-ray diffraction pattern for the magnetite is shown in FIG. 6 and demonstrates that the particles comprise about 98% of magnetite.

Example 2

This example demonstrates preparation of maghemite particles using a microemulsion system. A microemulsion consisting of isooctane as the continuous phase, aqueous ferrous chloride as the dispersed phase, sodium dodecyl sulfate (SDS) as the surfactant, and aerosol *OT (AOT) as co-surfactant was made according to the following procedure. Accurately weigh 1.72 g SDS and 11.61 g AOT and place them in a 500 ml Erlenmeyer flask. To this solid mixture, add 172 ml of isooctane. Next, add 4 ml of 1.0M ferrous chloride $FeCl_2.4H_2O$ solution. The mixture is then stirred vigorously with a magnetic stirrer for about 4 hours under nitrogen atmosphere until a clear pale yellow microemulsion is formed.

A second microemulsion is prepared by accurately weighing 1.72 g SDS and 11.61 g AOT and placing them in a 500 ml Erlenmeyer flask. To this solid mixture, add 172 ml of isooctane. Next, add 4 ml of 2.0M sodium nitrite $NaNO_2$ solution. The mixture is then stirred vigorously with a magnetic stirrer for about 4 hours under nitrogen atmosphere until a clear colorless microemulsion is formed.

Figure 7:
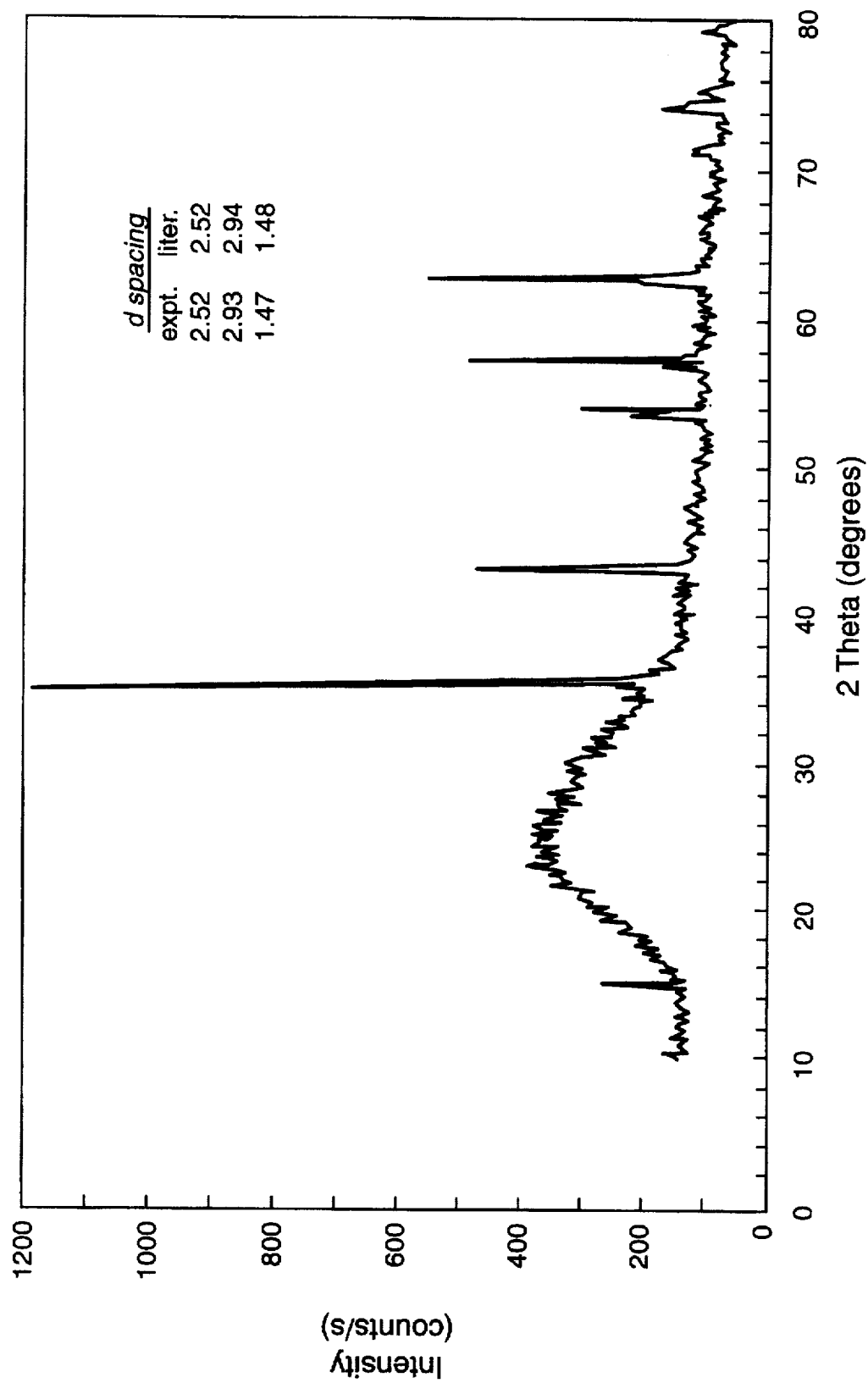
FIG. 7 is a graph showing an x-ray diffraction pattern of nano-size maghemite particles prepared according to one embodiment of the present invention.

Under nitrogen atmosphere, add 2 ml of triethylamine (TEA) to the ferrous chloride microemulsion. A bluish green precipitate is immediately formed upon addition of the TEA solution indicating the formation of green rust precursor particles. To this add 30 ml of the sodium nitrite microemulsion and heat the suspension to 50° C. for 10 minutes while stirring. The green rust transforms through oxidation to a dark brown solution/slurry of maghemite particles suspended in the reverse micelles of the microemulsion. A representative x-ray diffraction pattern for the maghemite particles is shown in FIG. 7 and show that the particles comprise about 98% of maghemite.

Example 3

This example demonstrates hydrophobic treatment of magnetite particles prepared as described in Example 1. According to the procedure of Example 1, after oxidation of the green rust to form the magnetite particles, sufficient water is added to the microemulsion system to break the emulsion. The organic liquid is decanted and the magnetite particles are permitted to settle in the remaining aqueous liquid. The aqueous phase liquid is decanted and the magnetite particles are washed three times with a mixture of water and chloroform to remove residual surfactant, organic and inorganic contaminants, with partial centrifugation between washings.

The washed magnetite particles are then slurried with an acidic aqueous solution of glacial acetic acid (pH 4.0) to form a slurry with ten weight percent of the magnetite particles. The magnetite particles are maintained in suspension by sonication while two drops of liquid vinyltriacetoxysilane are added to the slurry. The slurry is then heated to 50° C. for 30 minutes. The slurry is then centrifuged to obtain dry particles.

Figure 8:
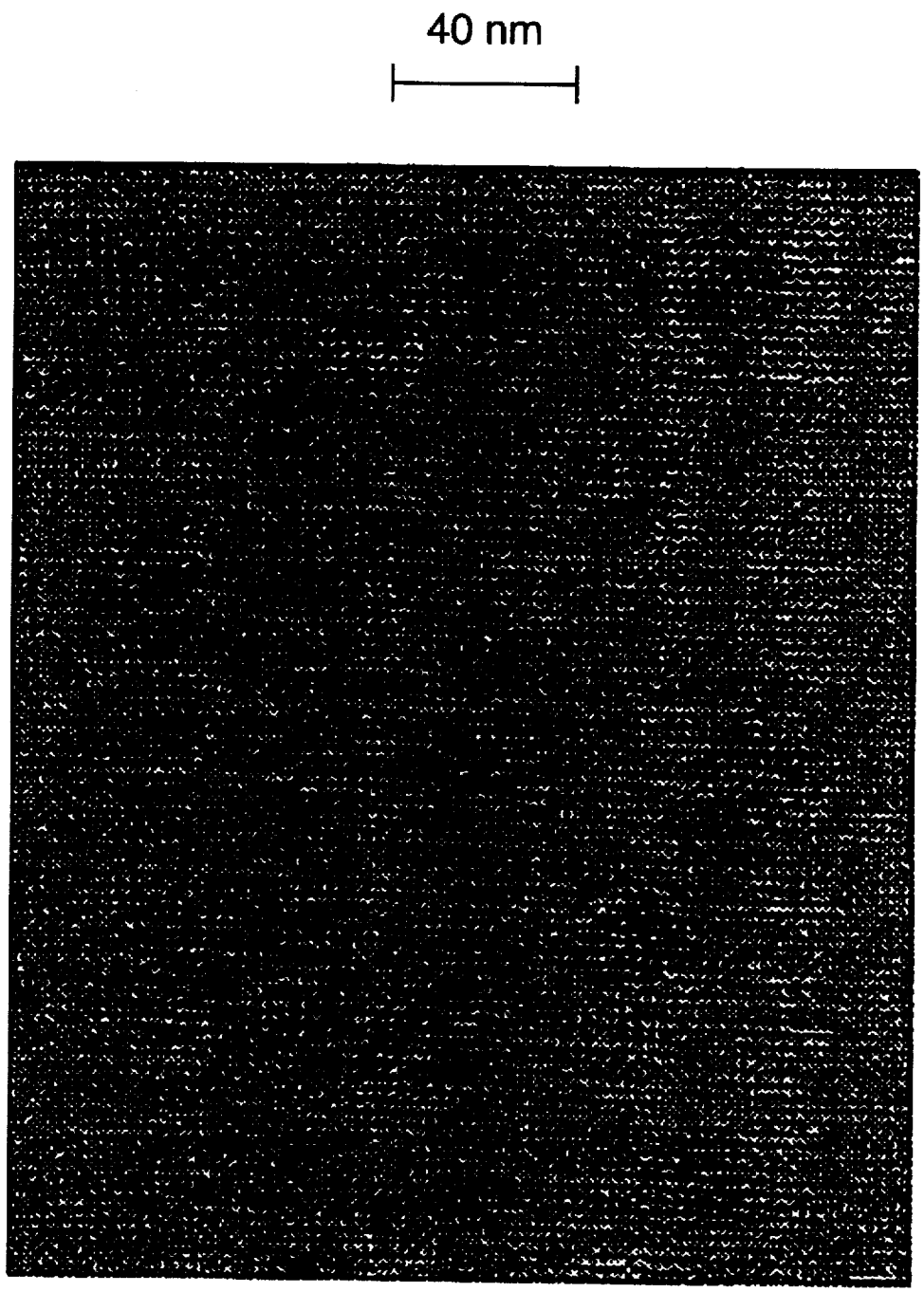
FIG. 8 is a transmission electron micrograph of hydrophobically treated magnetite particles prepared according to one embodiment of the present invention.

FIG. 8 shows a transmission electron micrograph of representative magnetite particles hydrophobically treated with vinylacetoxysilane. As seen in FIG. 8, the particles have an extremely narrow size distribution and are approximately 20 nanometers in size. Table 2 shows the magnetic properties of the hydrophobically treated nano-size magnetite particles compared to commercially available magnetite of about 0.5 micron size obtainable from Magnox Incorporated. As shown in Table 2, although the nano-size magnetite particles are extremely small, they still possess sufficient saturation magnetism to permit them to be used as magnetic particles in toner and other print medium products.

TABLE 2

| Materials | Saturation Magnetism (Mx) | Saturation (Magnetism (emu/g) | Coercivity (Oe) |
| --- | --- | --- | --- |
| Prepared $Fe_3O_4$ | 218.368 | 38.4 | 24.955 |
| HARCROS TB 5600 STANDARD I | 548.933 | 88.9 | 98.525 |
| MAGNOX TMB 114 STANDARD II | 588.178 | 85.7 | 53.49 |

Example 4

This example demonstrates preparation of magnetite particles in which the oxidant is dissolved in the continuous phase of the microemulsion. In a 250 ml Erlenmeyer flask is placed one gram of SDS and 6.75 grams AOT. Aerated isooctane is supplied by subjecting isooctane to sparging with air to saturate the isooctane with oxygen. To the Erlenmeyer flask is added 100 ml of the aerated isooctane and the mixture is vigorously stirred with a magnetic stirrer. Next is added 2 ml of 1.0M $FeCl_2.4H_2O$ solution and stirring is continued for about two hours under nitrogen atmosphere. A clear microemulsion with a pale yellow color is formed.

A second solution is prepared by dissolving 0.92 gm of triethylamine (TEA) and 100 ml of the aerated isooctane. Under nitrogen atmosphere, the TEA-isooctane solution is added to the microemulsion and the Erlenmeyer flask is sealed. A bluish green precipitate is immediately formed upon addition of the TEA solution to the ferrous chloride microemulsion, indicating the formation of green rust precursor particles. The suspension is next heated under the nitrogen atmosphere to 50° C. for one hour while stirring. The green rust transforms through slow oxidation to a black solution/slurry of magnetite particles suspended in the reverse micelles of the microemulsion system.

The magnetic particles of the present invention are useful in toner and other print media products used in reprographic processing. Toner is generally made by mixing the magnetic particles with a polymer resin. The mixing may occur in a polymer melt or may be accomplished by in-situ polymerization in the presence of magnetic particles mixed with appropriate monomer. As is conventionally known, additional components may be added to toner compositions such as colorants, including pigments and dyes; charge control agents, such as organometallics; and other modifying agents, such as waxes to assist cleaning of equipment in which the toner is used or other materials to increase friability of the toner.

Polymer resins useful for the present invention are those conventionally known for use in toner compositions. Such polymer resins may include repeating units from polymerization of one or more of the following monomers: styrene, and derivatives thereof such as styrene, o-methylstyrene, m-methylstyrene, p-methylstyrene, p-methoxystyrene, p-phenylstyrene, p-chlorostyrene, 2,4-dichlorostyrene, p-ethylstyrene, 2,4-dimethylstyrene, p-n-butylstyrene, p-tertbutylstyrene, p-n-hexylstyrene, p-n-octylstyrene, p-n-nonylstyrene, p-n-decylstyrene, p-n-dodecylstyrene and the like; unsaturated monoolefins such as ethylene, propylene, butylene, isobutylene and the like; vinyl halides such as vinyl chloride, vinylidene chloride, vinyl bromide, vinyl fluoride and the like; vinyl esters such as vinyl acetate, vinyl propionate, vinyl benzoate and the like; α-methylene aliphatic mono-carboxylic acid esters such as methyl methacrylate, ethyl methacrylate, propyl methacrylate, n-butyl methacrylate, isobutyl methacrylatic, n-octyl methacrylate, dodecyl methacrylate, 2-ethylhexyl methacrylate, stearyl methacrylate, phenyl methacrylate, dimethylaminoethyl methacrylate, diethylaminoethyl methacrylate and the like; acrylic acid esters such as methyl acrylate, ethyl acrylate, n-butyl acrylate, isobutyl acrylate, propyl acrylate, n-octyl acrylate, dodecyl acrylate, 2-ethylhexyl acrylate, stearyl acrylate, 2-chloroethyl acrylate, phenyl acrylate and the like; vinyl ethers such as vinyl methyl ether, vinyl ethyl ether, vinyl isobutyl ether and the like; vinyl ketones such as vinyl methyl ketone, vinyl hexyl ketone, vinyl isopropenyl ketone and the like; N-vinyl compounds such as n-vinylpyrrole, n-vinylcarbazone, N-vinylindone, N-vinylpyrrolidone and the like; vinyl-naphthalenes; acrylic acid or methacrylic acid derivatives such as acrylonitrile, methacrylonitrile, acrylamide, and others.

Toner is typically particulized as small particles. Preferably, the toner particles are smaller than about 10 microns, more preferably smaller than about 8 microns, and even more preferably smaller than about 6 microns. The toner may be made as a particulate by an extrusion process of the polymer resin/magnetite mixture or through comminution processing. Alternatively, the toner may be made in small particles by emulsion or suspension polymerization of the polymer resin in the presence of the magnetic particles to form in-situ the particles of the desired size.

The toners of the present invention are useful in reprographic processing, as previously discussed. Two major types of reprographic processing for which the materials of the present invention are well suited include electrophotographic processing and magnetographic processing, the fundamentals of both of which are well known in the art. In electrophotographic processes, an image is developed with toner on a photoconductive drum and the toner image is then transferred to a sheet substrate, such as paper. In a magnetographic process, the desired toner image is developed on a magnetic drum and the toner image is thereafter transferred to a sheet substrate such as paper. Also, the toner products of the present invention are useful for producing either spot color (e.g., highlight color) or process color, in which primary colors are mixed as needed to give a total color gambit.

It should be noted that the toner products of the present invention provide improved coloration properties due to the extremely small size of the nano-size magnetic particles and the surface treatment of those particles to provide hydrophobic chemical groups that at least partially mask the inherent color of the magnetic particles. Therefore, the magnetic particles are easier to incorporate into a color toner product without the same level of dulling of colors as occurs with conventionally available magnetic particles.

Various embodiments of the present invention have been described in detail. It should be recognized that any elements of any of these described embodiments can be combined in any combination with elements of any other embodiment. Furthermore, modifications and adaptations of the disclosed embodiments will be apparent to those skilled in the art. It is to be expressly understood that such modifications and adaptations are within the scope of the present invention as set forth in the following claims.

What is claimed is:

1. A method for making free flowing magnetic nanoparticles useful for reprographic processes, the method comprising the steps of:

providing magnetic particles, at least 90 weight percent of which have a size of smaller than about 60 nanometers;

chemically treating a surface of said magnetic particles to increase the hydrophobicity and dispersibility and to decrease the agglomeration tendency of said magnetic particles, and thereby enhance the free flowability of said magnetic particles;

wherein said chemical treating comprises attaching a hydrophobic chemical group to said magnetic particles through covalent bonding.

2. The method of claim 1, wherein:

said covalent bonding comprises a silane coupling agent intermediate between one of said magnetic particles and said hydrophobic chemical group.

3. The method of claim 1, wherein:

said step of chemically treating a surface of said particles comprises reacting said particles with a silane-based compound having a hydrophobic chemical group.

4. The method of claim 3, wherein:

said silane-based compound comprises vinyltriacetoxysilane.

5. The method of claim 1, wherein:

at least 90 weight percent of said magnetic particles have a size smaller than about 40 nanometers.

6. The method of claim 1, wherein:

greater than about 90 weight percent of said magnetic particles have a size that is from about 50 percent smaller than to about 50 percent larger than a weight median size of said magnetic particles.

7. The method of claim 1, wherein:

said particles have a saturation magnetism of larger than about 25 emu/g.

8. The method of claim 1, wherein:

said step of providing said magnetic particles comprises precipitation, in a disperse phase of a microemulsion, of metal-containing precursor particles and converting said metal-containing precursor particles to said magnetic particles; and wherein said step of chemically treating a surface of said magnetic particles is performed after said step of converting and before said magnetic particles are dried, to prevent said magnetic particles from agglomerating prior to said step of chemically treating.

9. The method of claim 1, wherein:

said step of providing said magnetic particles comprises precipitation of metal-containing precursor particles in a disperse phase of a microemulsion; and converting said metal-containing precursor particles to said magnetic particles.

10. The method of claim 1, wherein:

said magnetic particles comprise greater than about 90 weight percent of at least one magnetic iron oxide selected from the group consisting of magnetite ($Fe_3O_4$), maghemite (gamma-$Fe_2O_3$) and combinations thereof.

11. A reprographic print medium, comprising:

toner particles including iron-containing magnetic particles and a polymer, at least 90 weight percent of said magnetic particles being smaller than about 60 nanometers in size;

wherein a surface of said magnetic particles is at least partially covered by a surface coating material having hydrophobic properties, to increase the ease with which said magnetic particles may be dispersed and to reduce the tendency of said magnetic particles to agglomerate; said surface coating material comprises a hydrophobic chemical group attached to a surface portion of said magnetic particles through covalent bonding.

12. The reprographic print medium of claim 11, wherein:

said hydrophobic chemical group is attached to a surface portion of said particles by covalent bonding through a silane coupling agent.

13. The reprographic print medium of claim 11, wherein:

said surface coating material comprises the reaction residue of vinyltriacetoxysilane that is covalently bonded with a surface portion of said magnetic particles.

14. The reprographic print medium of claim 11, wherein:

said magnetic particles result from a process of manufacture comprising precipitation of a metal-containing particle in a disperse phase of a microemulsion.

15. The reprographic print medium of claim 11, wherein:

said surface coating material comprises a hydrophobic chemical group that masks, at least in part, a natural color of said magnetic particles.

16. The reprographic print medium of claim 11, wherein:

said surface coating material comprises a chromophore attached with said magnetic particles through covalent bonding.

17. Magnetic particles with improved dispersibility useful in making toner for use in reprographic processes, the magnetic particles each comprising:

an iron-containing magnetic core having a size of smaller than about 60 nanometers;

hydrophobic chemical groups about the outer surface of the iron-containing magnetic core to increase dispersibility of said core and to decrease the susceptibility of said core to agglomerate with other such cores, said hydrophobic chemical groups attached with said iron-containing magnetic cores through covalent bonding.

18. The magnetic particles of claim 17, wherein:

said iron-containing magnetic core results from a process of manufacture comprising precipitation of iron-containing particles in a disperse phase of a microemulsion.

19. The magnetic particles of claim 17, wherein:

said hydrophobic chemical groups are attached to said outer surface of said iron-containing magnetic core through a silane coupling agent.

20. The magnetic particles of claim 19, wherein:

said hydrophobic chemical groups at least partially mask a natural color of said iron-containing magnetic core.

21. The magnetic particles of claim 19, wherein:

said hydrophobic chemical groups comprise a chromophore.

22. The magnetic particles of claim 17, wherein:

said iron-containing magnetic core has a size of smaller than about 40 nanometers.

23. The magnetic particles of claim 17, wherein:

said magnetic particles have a saturation magnetism of larger than about 25 emu/g.

24. The magnetic particles of claim 17, wherein:

said iron-containing magnetic core comprises at least one of magnetite ($Fe_3O_4$) and maghemite (gamma-$Fe_2O_3$).

25. The reprographic print medium of claim 11, wherein:

said toner particles are of a size that is smaller than about 10 microns.

* * * * *